Inventors:
Raymond L. Meeder
Charles E. Mielke
By: Graf, Nierman & Burmeister
A. Horneys United States Patent Office 3,126,484
Patented Mar. 24, 1964

3,126,484
RADIOACTIVE SOURCE SHIELDING DEVICE
WITH SAFETY LATCHING MEANS
Raymond L. Meeder, Palos Heights, and Charles E. Mielke, Elmwood Park, Ill., assignors to Nuclear-Chicago Corporation, Des Plaines, Ill., a corporation of Delaware
Filed Jan. 5, 1960, Ser. No. 617
13 Claims. (Cl. 250—106)

This invention relates to an improvement in devices employing radioactive sources, and more specifically to radio-activity devices designed for minimizing radiation hazards to personnel.

In expanding the use of radioactivity devices to industrial, agricultural, and similar fields, it is a practical necessity that they must be capable of use by persons having little training and experience in the handling of such devices; the precautions taken in the handling of radio-active sources by trained personnel in scientific and similar institutions must be replaced by safeguards of a highly reliable nature built into the devices themselves, thus minimizing the hazard of human error. The present invention was made in connection with the provision of such safeguards in a source-and-detector assembly for the surface measurement of the moisture content of soil, the instrument being designed for field utilization for such purposes as the taking of such measurements in road construction, agricultural research, irrigation control, and similar uses. The particular embodiment of the invention to be described herein, accordingly, is a surface probe employing the return of neutrons from the surface upon which the probe is placed as an indication of the moisture content of the surface soil. It will, of course, be understood that such measurements are not in themselves for the essence of the present invention, devices of this broad description having heretofore been described and used. By the same token, it will be seen that the safety features of the present invention are not limited in their application to the particular type of instrument in connection with which the invention is to be illustrated and described herein, the basic teachings being applicable to a wide variety of radioactivity devices.

The improved safety of radioactivity devices employing the present invention is accomplished by the provision of a number of constructional features which co-operate to minimize the possibility of accidental exposure of personnel to radiation due to human error. The chief hazard of employing any well-designed radioactivity device stems from inadvertent exposure of the source outside the shield in which the source is encased during the relatively long periods in which the device is not in use. In some types of radioactivity apparatus, it is possible to keep the source permanently within its shield and introduce into the shield, for measurement or other processing, the substance or article to be subjected to radiation. In such a case, the matter of preventing accidental exposure of personnel is relatively simple. However, where measurement or other processing is to be done on articles or substances which cannot be inserted inside a radiation shield, as in the case of measurement of properties of soil without the removal of samples, it is inherent in the operation of a device for such purposes that the source must, in the operation of the device, be removed from its shield in order to irradiate the substance or article under processing, and the matter of assuring that human error will not produce a serious radiation hazard becomes much more difficult.

It is accordingly the principal object of this invention to provide a construction for radioactivity devices in which the possibility of human error leading to exposure of the radioactivity source outside its shield during periods when the device is not in actual use is minimized. As is well known, the great hazard of dealing with radioactive sources of low level lies in the possibility of exposure of the source during periods of non-use, since the effects of radiation on humans are cumulative, and even sources of an intensity so low that they do no appreciable body damage during reasonable periods of use may nevertheless constitute very severe hazards if permitted to be stored in a condition such that the source is unshielded. Accordingly, the above principal object of the invention is accomplished in part by the provision of mechanism to prevent such storage. Further objects and advantages of the present invention lie in high reliability of such mechanism in operation, coupled with a simplicity of construction which makes the cost of such mechanism sufficiently low to permit practical commercial utilization in radioactivity devices which remain advantageous from an economic standpoint.

A further hazard of radioactivity devices arises from occasional requirements of servicing. In general, the servicing of radioactivity devices requires the removal of the source from the device during servicing operations, either to permit handling of the components other than the source, such as detectors and electronic equipment, or for purposes of replacement of the source itself, as in the case of sources of relatively short half-life. In general, the simplication of the task of source removal for servicing purposes, which will, of course, be performed in any event by highly skilled personnel, raises the possibility that unskilled persons will remove the source, and thus create a hazardous condition, either by attempting to make repairs in violation of instructions to the contrary, or for other reasons. It is accordingly a further object of the present invention to provide a simple and inexpensive construction whereby removal of the source from the device may readily be accomplished in a simple manner by skilled personnel familiar with the procedure for such removal, but which nevertheless minimizes the possibility that unskilled persons will accomplish such removal, either deliberately or accidentally.

For understanding of the manner in which these objects of the present invention are accomplished, reference is made to the embodiment of the invention, illustrated in the annexed drawing and described below, this embodiment being a source-and-detector probe for measurement of surface soil moisture content. The general and specific principles of construction of the invention will become apparent from study of this embodiment.

Referring now to the drawing, it will be seen that the illustrated device employs a rectangular housing 20 having a bottom plate 22 and a top plate 24. In the bottom portion of the housing, a support plate 26 is mounted on bosses 28 providing a spacing between the support plate 26 and the bottom plate. A neutron reflector 30 rests on the support plate and a centrally apertured lead radiation shield 32 is atop the reflector. The bottom end of the shield is formed with a diametrically extending rectangular groove or channel 34 in which are suitably encased shield blocks 36 urged radially inwardly by coil springs 38 so that the blocks 36 meet at the center of the shield in the condition of FIGURE 1. The blocks 36 have bevelled cam surfaces 40 at their upper inner edges, thus causing the blocks to spread and permit the passage from the shield of a source assembly later to be described, as shown in FIGURE 2. Extending from the upper end of the shield is a hub block 42 having a central aperture in alignment with the central aperture in the shield 32. A liner tube 44 is secured in the vertical passage thus formed through the shield and the hub block. The shield is provided with a suitable cover 46, flanged at 48 at the lower end thereof, the flange 48 seating over a flange 50 on the reflector 30, the assembly thus described being secured to the support plate 26 by bolts 52 threaded into two of the bosses 28, and by further bolt-and-nut fasteners 54. The top plate 24 is apertured at 56 to pass the upwardly extending hub block 42, which accordingly extends up out of the housing. Surrounding the block 42 are a ring 58 on the under surface of the top plate 24 of the housing, a gasket 60 being interposed, and a ferrule 62 on the upper surface of the top housing plate 24. The ferrule 62 is of substantially larger inner diameter than the outer diameter of block 42. Seated on the lip of the ferrule 62 is a rotor ring 64 having a groove 66 in the inner surface receiving the upwardly extending lip of the ferrule.

A stem 68 extends radially outward from the rotor ring 64 and has on the outer end a knob 70 for rotational manipulation of the rotor ring. A coiled spring 72 has bent ends 74 respectively seated in a socket bore 76 in the ring 58 and in a similar socket bore 78 in the rotor ring 64. Atop the hub block 42 is an inverted cup-shaped cap 80, secured by screws 82. The side wall of the cap 80 has approximately 100° cut away to pass the stem 68, the ends of this cut away portion constituting end stops 86 limiting the travel of the stem 68 and thus of the rotor ring 64. The spring 72 accordingly urges the ring 64 to a normal position from which it may be manually moved until striking the other end of the stop. Near the top of the block 42, a radial aperture 92 extends through the block 42 and the liner tube 44 (see FIGURES 10-13). A pair of small balls 90 is seated in this aperture, the sum of the diameters of the balls being slightly greater than the combined thickness of this portion of the block 42 and the liner tube 44. Within the liner tube 44 is slideably mounted a source plunger tube 94 having a circumferential groove 96 in the neighborhood of its mid-point. The rotor ring 64 has the inner surface thereof recessed over a small but substantial angular portion at 98.

Figures 10, 11, 12, 13, 14:
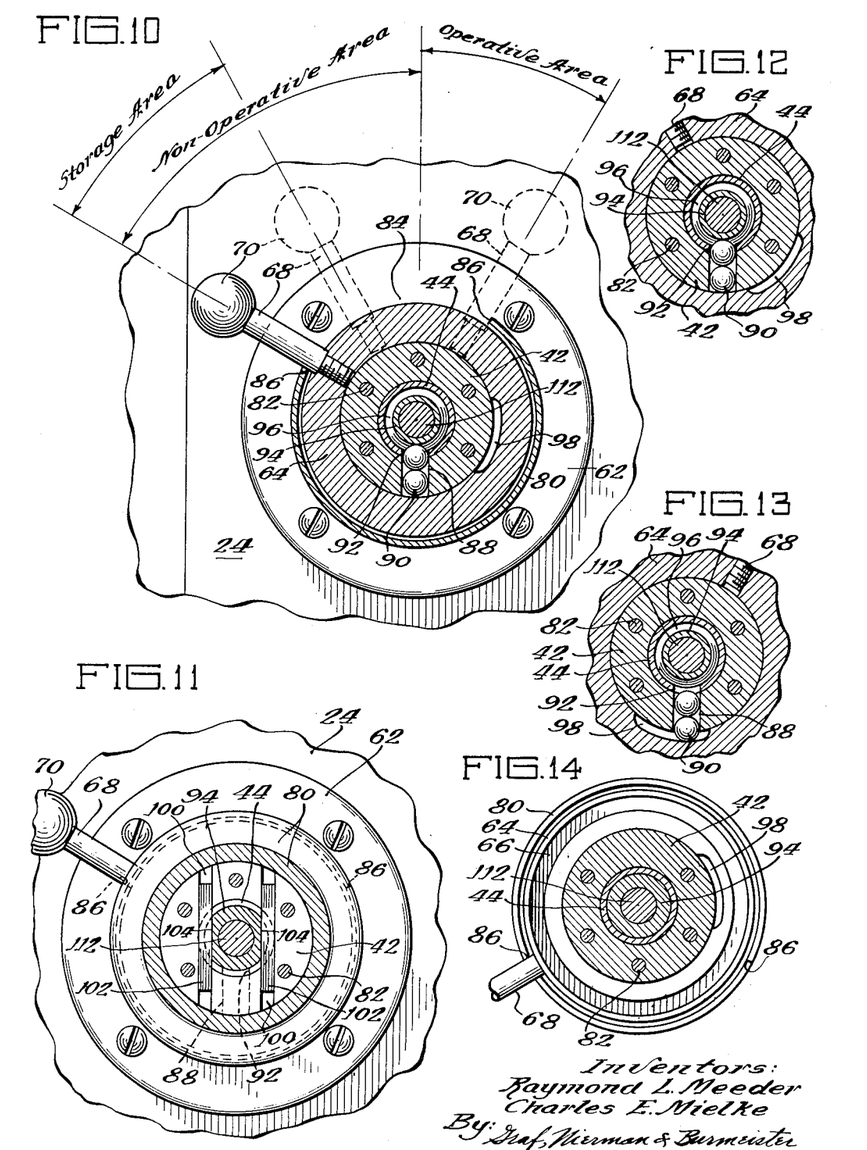
FIGURE 10 is a horizontal sectional view taken along the line 10—10 of FIGURE 1 in the direction indicated by arrows, and indicating certain alternate positions of the parts in dotted form.
FIGURE 11 is a horizontal sectional view taken along the line 11—11 of FIGURE 1 in the direction indicated by arrows.
FIGURE 12 is a horizontal sectional view corresponding to a portion of FIGURE 10, but illustrating the parts in one of the alternate conditions indicated by dotting in FIGURE 10.
FIGURE 13 is a view corresponding to a portion of FIGURE 10, but illustrating the parts in a second alternate position.
FIGURE 14 is a horizontal sectional view taken along the line 14—14 of FIGURE 1.
Figure 15:
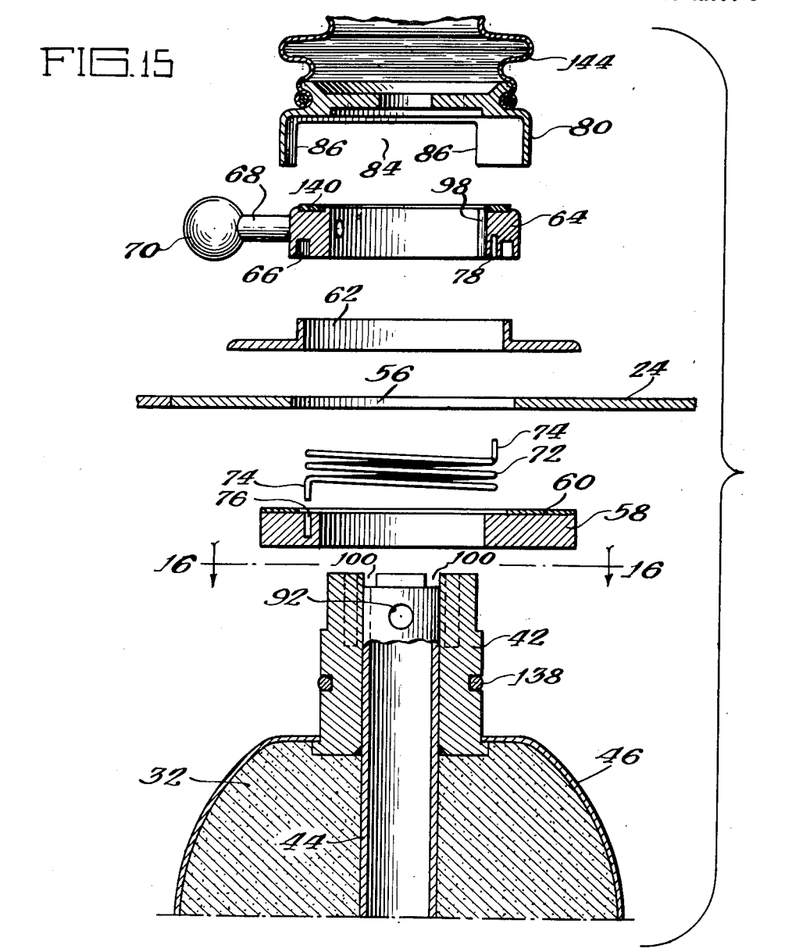
FIGURE 15 is an exploded view corresponding to an enlargement of a portion of FIGURE 1.
Figure 16:
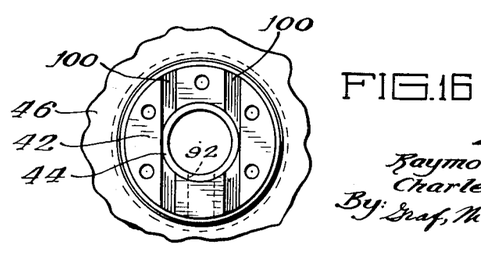
FIGURE 16 is a top plan view of a part of the device, taken along the line 16—16 of FIGURE 15 in the direction indicated by arrows.

As indicated in FIGURE 10, the operating knob 70 has two principal ranges of positions, one being designated, in FIGURE 10, the "non-operative area" and the other the "operative area." The significance of this terminology will become apparent after further description of other components of the device and their function. For present purposes, however, it may be observed that in the non-operative area the recess 98 in the rotor ring 42 is angularly displaced from the balls 90, so that the inntermost ball seats in the groove 96, thus locking the plunger tube 94 against vertical motion. This condition prevails throughout the "non-operative area" of rotation, whether the stem 68 is against the stop 86 against which it is biased by the spring 72 (the solid position of FIGURE 10) or in an intermediate position (illustrated in FIGURE 12, and corresponding to the first clockwise dotted position in FIGURE 10). As the knob 70 is brought to the "operative area," the balls 90 are freed to roll in either direction, i.e., to assume a position of seating within the groove 96 or of seating within the groove 98. The vertically opposed faces of the groove 96 are bevelled to form a cam surface, and the rotationally spaced ends of the recess 98 are similarly tapered. The balls 90 form in essence a freely-moving locking member of a length not exceeding the sum of the length of their seating aperture and one of the adjoining grooves or recesses. Thus, when the knob 70 is in the operative area, one of two conditions can be established. If the knob 70 is released, it will return to the non-operative area to restore the position of FIGURE 10, in which the plunger 94 is locked in its vertical position. If the plunger is moved vertically while the knob 70 is held in the operative area, the knob 70 is locked into the operative area while the plunger is free to reciprocate. There is thus formed a simple, but highly effective, type of latch or lock for the source plunger in which the knob 70, which serves as the manually operable unlatching member, is itself latched or locked into an "unlatched" position, when the plunger is in any position other than its latched position. As will be brought out more clearly below, the latched position of the plunger corresponds to a position in which the source is withdrawn into the shield. It will thus be seen that the knob has first and second positions designated as "operative" and "non-operative," and that the mechanism described locks the knob in the first position whenever the source is in the operative position, in which it is outside the shield.

The top end of the hub block 42 is formed with parallel transverse keyways 100, in which are seated keys 102. The upper portion of the plunger tube 94 has opposed flats 104 machined thereon to fit between the keys 102 and thus key the plunger against rotation. In the lower end of the plunger tube 94 is the radiation source 106, seated against an internal snap ring 108. The source is backed by a coil spring 110, which is in turn held in position by a rod 112 extending through the top end of the plunger tube. The upper end of the rod 112 has a transverse bore 114, in which is seated a pointed set screw 116, threaded into a long axial aperture 118 in a crossbar 120 to which the top end of the plunger tube 94 is joined.

The outermost end of the rod 112 is flanged at 122, and the set screw 116 locks the rod into the plunger tube with the flange 122 seated on the upper surface of the crossbar 120. A U-shaped handle 124 has one leg 126 pivoted to an end of the crossbar 120 by a loose-fitting pivot 128. The other leg 130 of the handle 124 is formed at the end with a vertical channel 132. This end 134 of the crossbar 120 is wedge-shaped to wedge into the channel 132. A knurled bolt 136 is threaded into the outer end of the axial aperture 118, and the handle 124 is pivoted on this bolt at this end of the crossbar.

Figures 1, 5, 6:
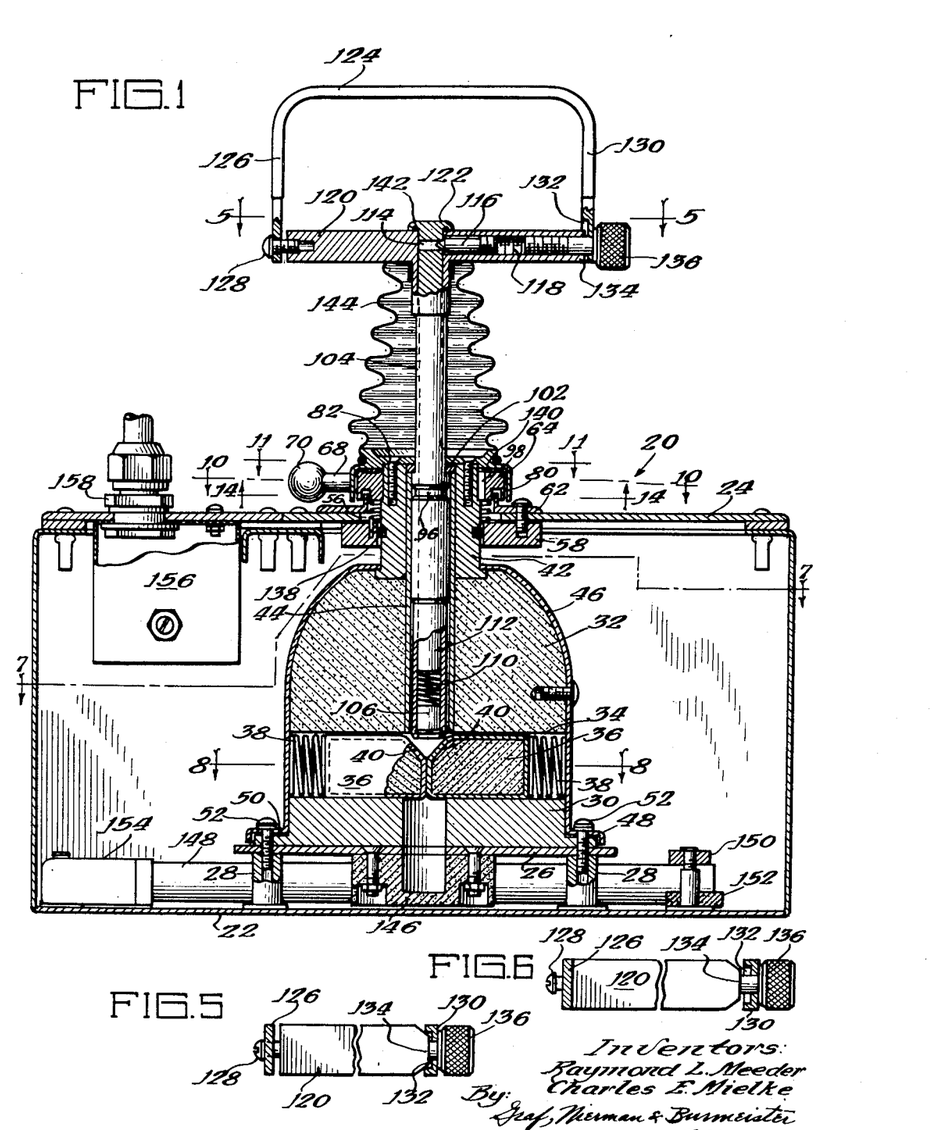
FIGURE 1 is a vertical sectional view, partly in elevation, of a surface moisture probe embodying the teachings of the invention, the probe being shown in the condition of carrying and storage wherein the source is withdrawn into the shield.
FIGURE 5 is a detailed sectional view taken along the line 5—5 of FIGURE 1, in the direction indicated by arrows.
FIGURE 6 is a view corresponding to FIGURE 5 but illustrating the parts in a different condition, in which the handle constituting a portion of the device is unlocked for folding.
Figure 2:
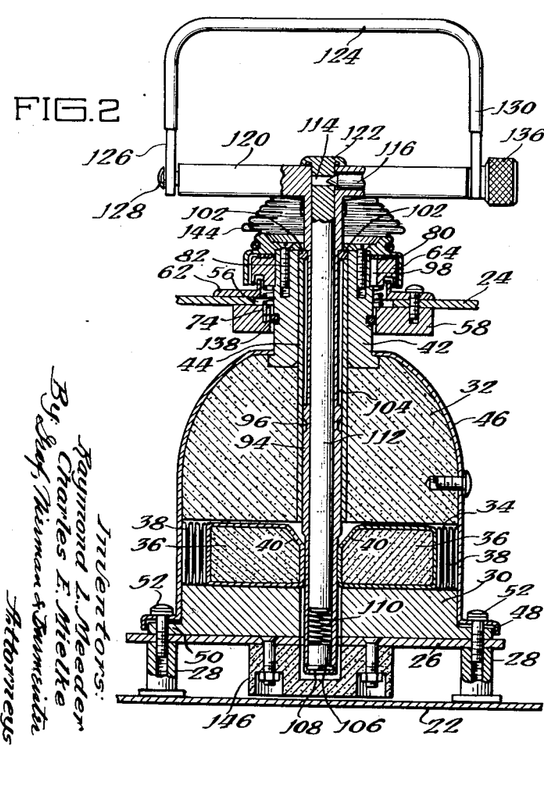
FIGURE 2 is a view similar to FIGURE 1, but illustrating the parts in an operating condition in which the source is exposed beneath the shield to irradiate a surface upon which the device is placed.

As shown in FIGURE 5, when the knurled bolt 136 is tightened with the handle 124 in the erect or extended position shown in FIGURE 1, the handle is locked in this position by wedging of the end 134 of the crossbar 120 into the channel 132. When the bolt 136 is loosened, as in FIGURE 6, the handle 124 is free to slide to the position in which the wedge-shaped end 134 is disengaged from the channel 132, thus permitting free folding of the handle 124 down to the position shown in FIGURE 4. Also, the bolt 136 may be completely removed, in which event access is provided to the set screw 116. Upon loosening of this screw, the rod 112 may be removed from the plunger tube 94, thus permitting removal of the spring 110 and the source 106 through the upper end of the tube. It will be observed that this sequence of operation is well designed for the purpose of providing a "keyed" method of source removal which permits removal of the source in an extremely convenient manner by a person familiar with the device and its mode of construction while creating a virtually negligible hazard that the source will be removed or loosened by mere "tinkering" with the device.

The entire mechanism is suitably sealed to prevent the entrance of moisture, dust, etc. into the housing 20. For this purpose an O-ring 142 is compressed by the flange 122 on the rod 112. An O-ring 138 seals the interface between the hub block 42 and the ring 58. A gasket 140 acts as the seal between the rotor ring 64 and the cap 80, and also as a bearing surface. Moisture-proofing is completed by a bellows 144, of conical configuration, sealed at its lower end to the cap 80 and at its upper end to the top end of the plunger tube 94.

On the bottom of the housing is a source receptacle cup 146 in alignment with the plunger tube 94, the lower end of the plunger tube, containing the source 106, seating in this cup in the operating position of handle 124, as shown in FIGURE 2. Substantially covering the area of the bottom of the housing on either side of the source cup are an array of parallel neutron counters 148, secured by mounting strips 150 and 152, the array being formed into groups, each terminating in a header 154. Within the top portion of the housing is a preamplifier chassis 156 provided externally with a coaxial cable fitting 158.

It will of course be understood that the particular arrangement or configuration of the source 106, the reflector 30 and the counters 148 constitutes no portion of the present invention, being in part conventional in nature and in part the contribution of other inventors to the particular device illustrated in the drawing, being more fully described in an application of Robert L. Carver and Philip Shevick, Serial No. 36,945, filed June 17, 1960, abandoned upon the filing of a continuation-in-part thereof, Serial No. 325,186, filed November 20, 1963, and in an application of Ariel G. Schrodt and Philip Shevick, Serial No. 36,852, filed June 17, 1960. Accordingly, since the nuclear and electronic features employed during actual use of the instrument constitute no portion of the present invention and since the invention is obviously useable in radioactivity devices of completely different design as regards nuclear and electronic features, these portions of the illustrated device are not further described herein.

Figure 3:
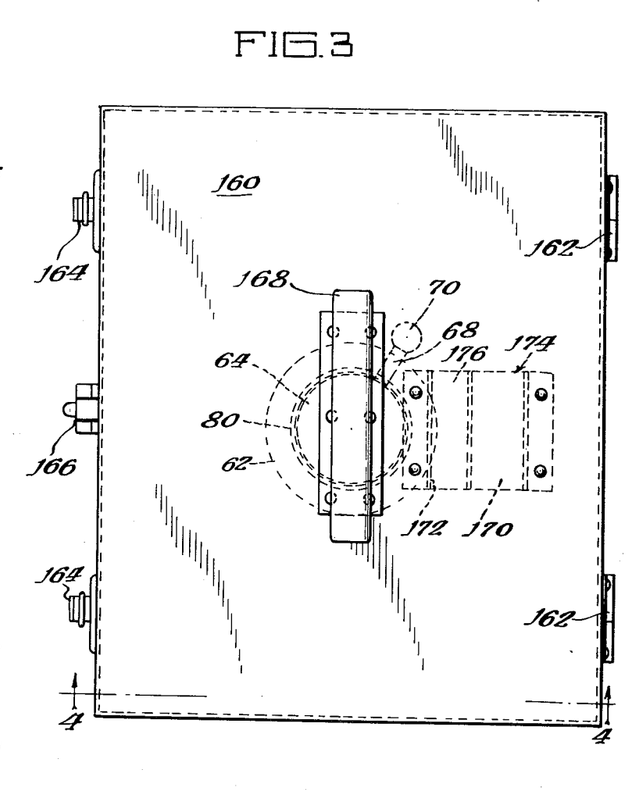
FIGURE 3 is a top plan view of the device with a cover installed thereover.

The housing 20 is provided with a conventional-appearing rectangular cover 160, hinged along one edge at 162, and having hasps or latches 164 and a lock 166 serving as inter-engaging receiving means on the other edge and a carrying handle 168 on the top. On the under surface of the top of the cover 160 is a bracket or stop 170 formed by depending arms 172 and 174 connected at the lower end by a web 176. When the cover is completely closed, the lower end of the bracket or stop 170 occupies the entire "operative" position of the knob 70 (confining the knob 70 to the "storage" portion of the "non-operative" region).

The details of construction and individual functional operation of the various parts of the illustrated device having been described, the over-all combination may readily be understood. For this purpose, it is advantageous to consider the portion of the device to which the present invention pertains as operating in a cycle of use, on the one hand, and transportation and storage, on the other. For purposes of convenience, the starting point of the cycle may be selected as the condition of FIGURE 1, in which the cover (not shown in this figure) is completely opened (or removed in the case of hinges designed for such removal). In the view of FIGURE 1, the handle 124 has been erected, and locked into position by tightening of the bolt 136, as previously described. In this condition, the device may be placed on the surface whose characteristics are to be measured and transported from place to place by the handle 124 for a series of such measurements, as in the measurement of soil characteristics in road building. The source 106 is shielded in all directions as regards gamma rays in this condition by the shield 32, the blocks 36 and the rod 112. As will be obvious to those skilled in the art, the source 106, for example of radium-beryllium, although used in the device as a neutron emitter, has a relatively high gamma emission, the neutron emission being of sufficiently low level to prevent the existence of any radiation hazard due to neutron radiation. Thus the encasing of the source in the gamma shield prevents the existence of any radiation hazard. The shielding requirement, i.e., the required weight and thickness of the shield, is minimized by the position of the source 106 in the withdrawn condition. In this position, the source is at the center of the housing in all dimensions, so that the radiation intensity at any portion of the surface of the housing is minimized by the well-known inverse square law of radiation from a point source. As previously shown, the plunger tube is latched in this raised or retracted position. To unlatch the plunger tube when the device is placed on a surface under measurement, the operator rotates the knob 70 to the "operative" position (FIGURE 10) against the force exerted by spring 72 and drives the plunger tube 94 downwardly to the operating position shown in FIGURE 2. In this position the presence of the source 106 forms a radiation zone closely adjacent to the surface under measurement. As previously indicated, the general method of measurement constitutes no part of the present invention, and it will suffice for present purposes to merely point out that the response of the neutron counters 148, as measured by the preamplifier 156 and the external equipment to which the coaxial output 158 is connected, is indicative of the moisture content of the soil. As is well known, the shield cup 146 serves to shield the neutron counters from the gamma rays sufficiently so as not to interfere with the measurement of the slowed neutrons to which the detectors 148 are responsive.

Figure 4:
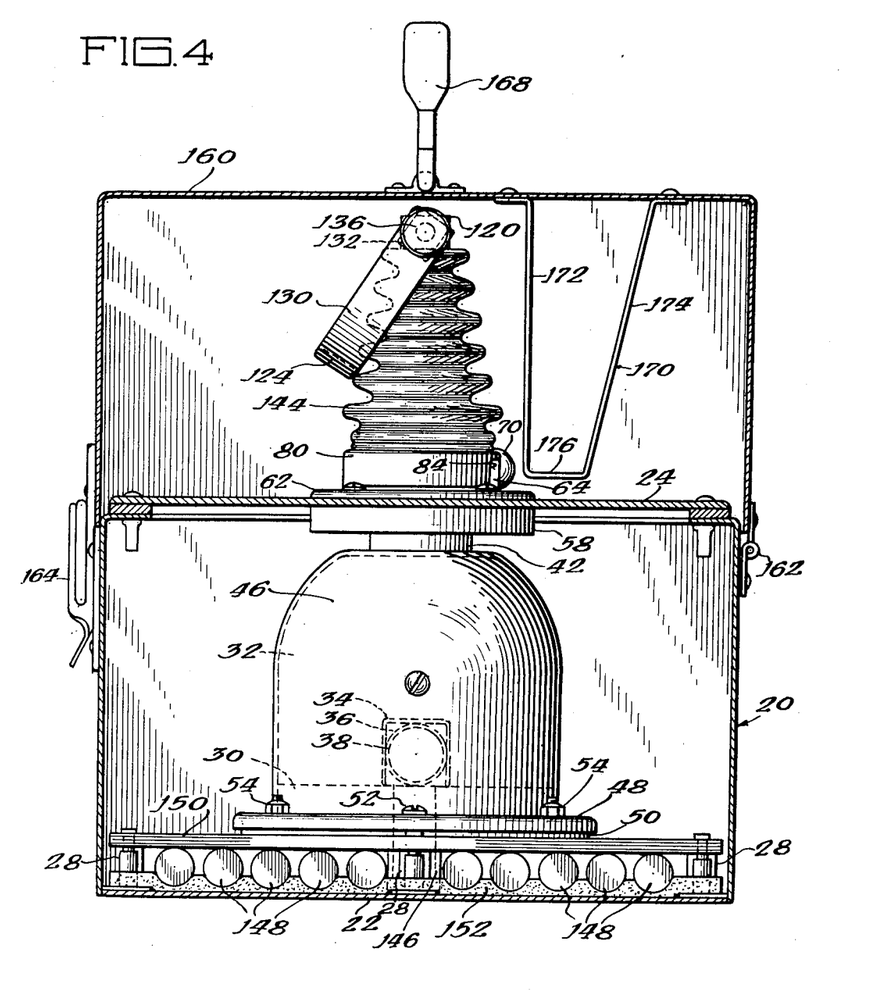
FIGURE 4 is a vertical sectional view of the device taken along the line 4—4 of FIGURE 3 in the direction indicated by arrows.
Figure 7:
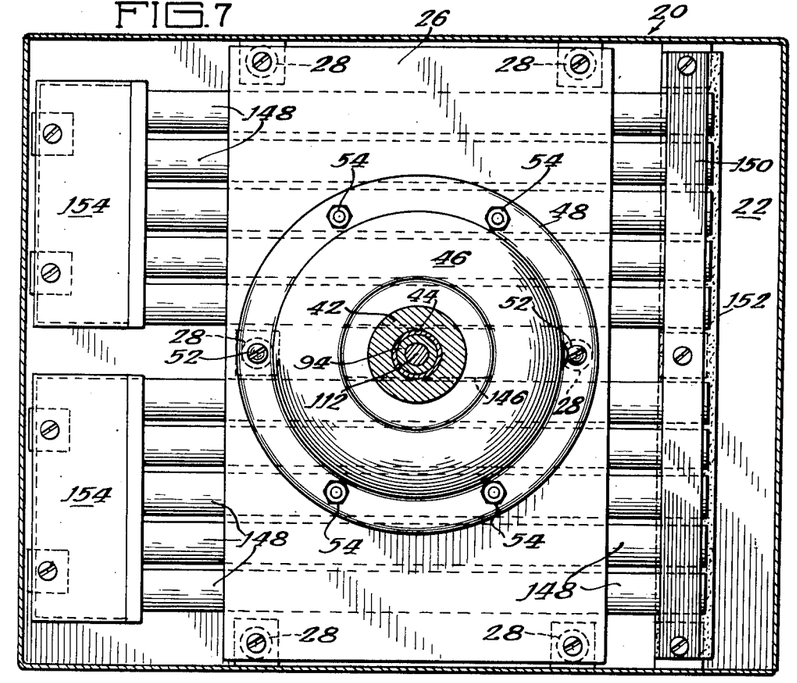
FIGURE 7 is a horizontal sectional view taken along the offset line 7—7 of FIGURE 1 in the direction indicated by arrows.
Figure 8:
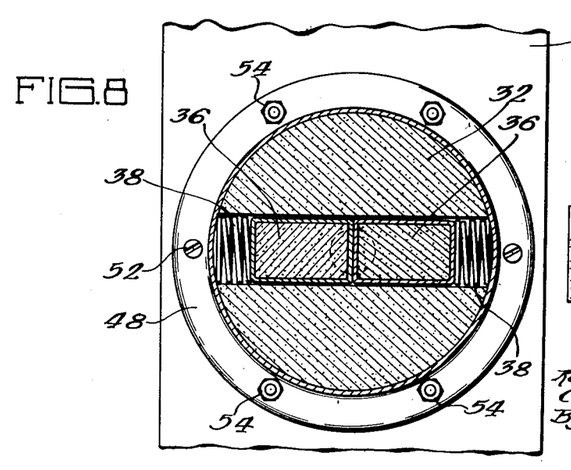
FIGURE 8 is a horizontal sectional view taken along the line 8—8 of FIGURE 1 in the direction indicated by arrows.
Figure 9:
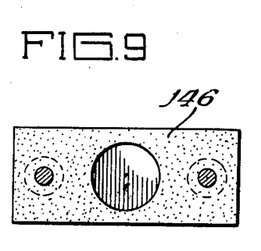
FIGURE 9 is a top plan view of a source receptacle constituting a portion of the device.

Upon completion of a measurement, the device may be merely picked up by the handle 124, automatically restoring the device to the condition of FIGURE 1, and moved to another location for further measurement. As previously indicated, the knob 70, which is the operating member of the latch, is locked into the "operative area" during the time that the source is exposed outside the shield 32, but snaps to the latched position when the source is encased in the shield. This procedure may be repeated for as many measurements as are desired. For temporary storage, the apparatus may be left in the position of FIGURE 1, no radiation hazard occurring. It will be noted, however, that the cover 160, constructed as previously described, serves an important purpose in connection with transportation and storage. If a mere conventional hollow cover were employed, there would be a possibility that the cover could be inadvertently installed after the last measurement, with the source in the position shown in FIGURE 2. In this event, the safety provision of automatic withdrawal of the source into the shield when the device is picked up by handle 124 would be by-passed, since under these conditions it would be possible to transport the instrument by the cover handle without encasing the source in the shield. This possibility is prevented by the present construction of the cover 160 since the cover 160, constructed as described above, not only provides the protection against damage or tampering afforded by any conventional instrument cover, but also assures that the cover can not be closed with the device in an unsafe condition, nor can any mechanical failure due to vibration or jarring create an unsafe condition within the closed covered housing. As previously stated, the lower end of the abutment portion of the cover formed by the bracket or stop 170 is in the "operative" area of the rotational path of the knob 70 in the closed position of the cover, as seen in FIGURES 3 and 4. Thus the cover is blocked against complete closure, and the cover latches can not be interengaged unless the knob 70 is in the non-operative area so that closure of the cover is unimpeded. As previously discussed, the knob can not be placed in this area unless the source is withdrawn into the shield. Accordingly, it is not possible to close the cover unless the plunger tube is in its upper latched position. Furthermore, once the cover is fully closed, the plunger tube is locked against unlatching since the bracket 170 acts as a stop preventing unlatching of the plunger even if there should be a mechanical failure of the spring which holds the latch.

Closing of the cover also requires that the handle 124 be folded down as shown in FIGURE 4. The construction illustrated in FIGURES 5 and 6, as previously described, permits such folding down of the handle while nevertheless permitting locking of the handle in the upright position, as in FIGURES 1 and 2, to make the connection between the handle and the housing rigid, and thus permit accurate placement of the instrument.

As previously indicated, the teachings of the invention may readily be adapted by persons skilled in the art to devices employing radioactivity sources for purposes far different from the purpose of the instrument in which the invention is embodied as illustrated in the drawing and described above. Further, the invention may be embodied even in constructions for the same purpose which differ greatly in detail and in appearance from the embodiment illustrated. Some of such alterations and modifications will be immediately obvious, while a much larger variety will be apparent after close study by those skilled in the art. For these reasons, the scope of the protection to be given the invention should not be determined from the particular embodiment herein described, but should extend to all structures falling within the descriptions of one or more of the annexed claims, and equivalents thereof.

What is claimed is:

1. In a radioactivity device having a shield, a source within the shield, means to expose the source outside the shield in the operating condition of the device, a handle, means responsive to upward motion of the handle to encase the source in the shield, and a permanently affixed manually operable latch securing the handle in the raised position, the improved construction characterized by a protective cover receiving the handle in all positions of the handle and having closed and opened positions, the cover having thereon an abutment portion in the path of motion of the latch and blocking release of the latch in the closed position of the cover, and means responsive to insertion of the source in the shield to move the latch from a position blocking closing of the cover to a position unblocking closing of the cover.

2. In a radioactivity device having a housing including a locking cover, a shield within the housing, a source within the shield, and means to expose the source outside the shield in the operative condition of the device, said exposing means including a manually operable exposing member beneath the cover, the improved construction characterized by an auxiliary movable member beneath the cover, having a first position blocking complete closure of the cover and a second position wherein closure of the cover is unimpeded, and mechanism coupled to the source and the movable member to lock the movable member in the first position when the source is in the operative position and to move the member to the second position in response to encasing of the source in the shield.

3. The device of claim 2 wherein the mechanism includes a source-manipulating element having respective positions wherein the source is exposed and shielded and means responsive to movement of the movable member to the second position to lock the source-manipulating element in the shielded position of the source.

4. The device of claim 3 wherein the cover has a portion blocking movement of the movable member from the second position to the first position, so that the source-manipulating element can not become unlocked when the cover is in place.

5. In a radioactivity device having a shield, a source within the shield, and means to expose the source in a radiation zone outside the shield in the operative condition of the device, the improved construction characterized by an aperture extending through the shield, a plunger reciprocable in the aperture and having its outer portion extending outside the shield in the direction opposite the radiation zone and having the source on the inner portion, the source being exposed in the radiation zone when the plunger is in an inserted position and the source being fully shielded when the plunger is in a retracted position, a manual operating member on said opposite side of the shield, manually operable latching means coupled to the operating member to latch the plunger in the retracted position in one position of the operating member and to free the plunger in the other position of the operating member, means responsive to insertion of the plunger to lock the operating member in the free position, and a protective cover on said opposite side of the shield, the cover having a portion which is blocked by the operating member in the free position of the operating member but is unimpeded by the operating member in the latched position of the operating member, so that the cover cannot be closed upon the device unless the device is latched in the condition wherein the source is encased in the shield, and the latch is locked when the cover is closed.

6. In a radioactivity device having a shield, a source within the shield, and means to expose the source beneath the shield in the operating condition of the device, the improved construction characterized by an aperture extending downward through the shield, a plunger reciprocable in the aperture and having the source secured to the lower end thereof so that the source is exposed below the shield when the plunger is in a lowered position and the source is within the shield when the plunger is in a raised position, a manual operating member above the shield, latching means coupled to the operating member to latch the plunger in the upper position in one position of the operating member and to free the plunger in the other position of the operating member, means responsive to lowering of the plunger to lock the operating member in the free position, and a protective cover having a portion abutting against the operating member in the unlatched position of the operating member but unimpeded by the operating member in the latched position of the operating member, so that the cover can not be closed upon the device unless the device is locked in the condition wherein the source is encased in the shield.

7. In a radioactivity device, a shield, an elongated tube extending into the shield, a source within the inner end of the tube, a handle crossbar on the outer end of the tube, an elongated retainer member within the tube securing the source in position and having a flanged outer end seated on the outer surface of the crossbar, a longitudinal bore in the crossbar intersecting the tube, a fastener member at the inner end of the bore securing the retainer member in the tube, and a cap on the bore.

8. The device of claim 7 including a U-shaped handle having the end of one arm pivoted on the cap and means for pivoting the end of the other arm on the opposite end of the crossbar.

9. A radioactivity device for use on horizontal surfaces comprising a shield having a vertical bore therethrough, a removable shielding member at the lower end of the bore, a tubular plunger reciprocable in the bore and having a source in the lower end thereof, a crossbar on the outer end of the plunger, an elongated retainer within the plunger having its lower end adjacent to the source and having a flanged outer end seated on the outer end of the plunger, a longitudinal bore in one end of the crossbar, fastening means within the bore locking the retainer in the plunger, a U-shaped handle having the arms thereof pivoted on the crossbar, a manually releasable lock securing the handle in a vertical position, one of the pivoted connections covering the bore, a recess on the plunger, a latching member adapted to seat in the recess to lock the plunger, a rotary cam surrounding the plunger and having a latched position wherein the latching member is seated in the groove and an unlatched position wherein the latching member is released from the groove, the cam having a protrusion thereon, and a hinged cover having open and closed positions and having a portion which, in the closed position of the cover, at least partially occupies the latched position of the protrusion on the cam.

10. In a radioactivity device, a shield, a source, and means to expose the source outside the shield in the operative condition of the device, said exposing means including a plunger reciprocable between retracted and inserted positions with respect to the device and having a recess in the outer surface thereof, a member in fixed position with respect to the shield adjacent to the plunger and having an aperture therethrough communicating with the recess on the plunger when the plunger is in the retracted position, the source being encased in the shield in this position of the plunger, a movable camming member in sliding relation to the first mentioned member and having a recess in the inner surface thereof, means for mounting the camming member for motion between respective positions wherein the recess is in alignment and out of alignment with the aperture, and at least one latching member reciprocable in the aperture and of an over-all dimension exceeding the length of the aperture by an amount smaller than the depth of either of the recesses, so that the plunger is locked in the retracted position when the movable member is in the position wherein its recess is out of alignment with the aperture, and the movable member is locked in the position wherein its recess is aligned with the aperture when the plunger is in the inserted position.

11. The device of claim 10 having a cover having a portion occupying, when the cover is fully seated, the same space as is occupied by a portion of the movable member when in the position in which the recess therein is in alignment with the aperture, so that the cover can not be seated when the source is outside the shield, and the source can not be removed from the shield when the cover is seated.

12. In a radioactivity device, a shield, a source within the shield, manually operable means on one side of the shield to expose the source in a radiation zone on the other side of the shield, manually operable latching means selectively securing and releasing the exposing means, a cover on said one side of the shield, and means responsive to closing and opening of the cover, respectively, to lock and unlock the latching means, the latching means being spring-biased to the condition securing the exposing means when the source is within the shield, and being locked in said position in response to closing of the cover, whereby the latching means may be conveniently used by the operator when the cover is removed, but the securing of the exposing means is independent of the spring-bias when the cover is closed.

13. A radioactivity device having a shielded source, means operable to expose an exterior radiation zone to radiations from the source, a permanently attached locking member having a locked position wherein it engages the exposing means to lock the exposing means only when the source is fully shielded, said locking member being movable from said position to an unlocked position to unlock the exposing means, and a cover having a portion at least partially occupying the unlocked position of the locking member when fully closed but free of portions occupying the locked position, said portion blocking movement of the locking member to the unlocked position so that the cover can be closed only when the source is fully shielded and accidental unlocking of the locking member is prevented by the cover.

References Cited in the file of this patent

UNITED STATES PATENTS

| | | |
|---|---|---|
| 2,798,164 | Untermeyer | July 2, 1957 |
| 2,876,363 | Forrer et al. | Mar. 3, 1959 |
| 2,891,168 | Goertz et al. | June 16, 1959 |
| 2,916,628 | Prest | Dec. 8, 1959 |
| 2,941,079 | Lucas | June 14, 1960 |